M. SLIWINSKI.
HIP SALVAGE DEVICE.
APPLICATION FILED NOV. 8, 1919.
1,333,783.
Patented Mar. 16, 1920.
3 SHEETS—SHEET 1.
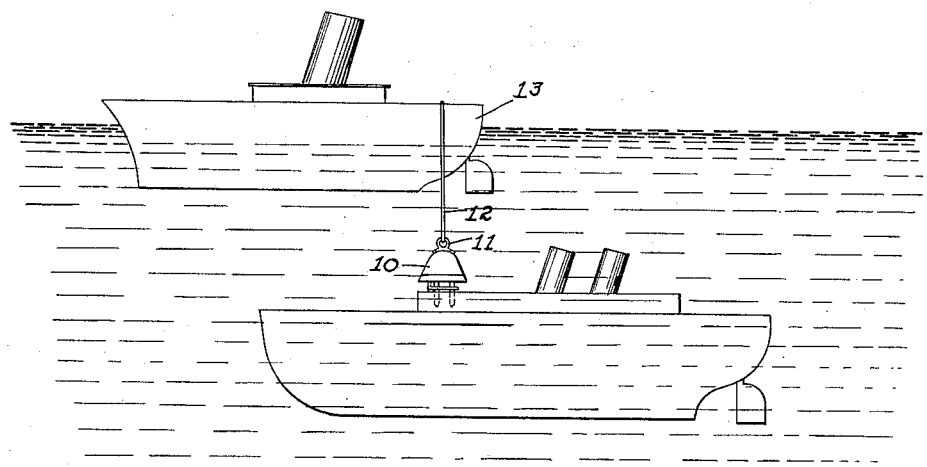
FIG_1
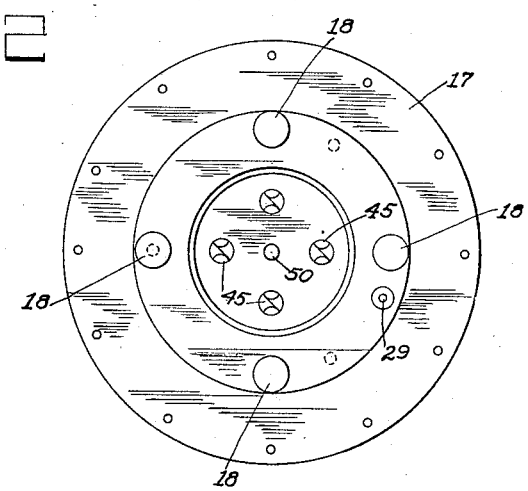
FIG_2
INVENTOR.
Michał Sliwinski
BY George C. Heinrich
ATTORNEY.

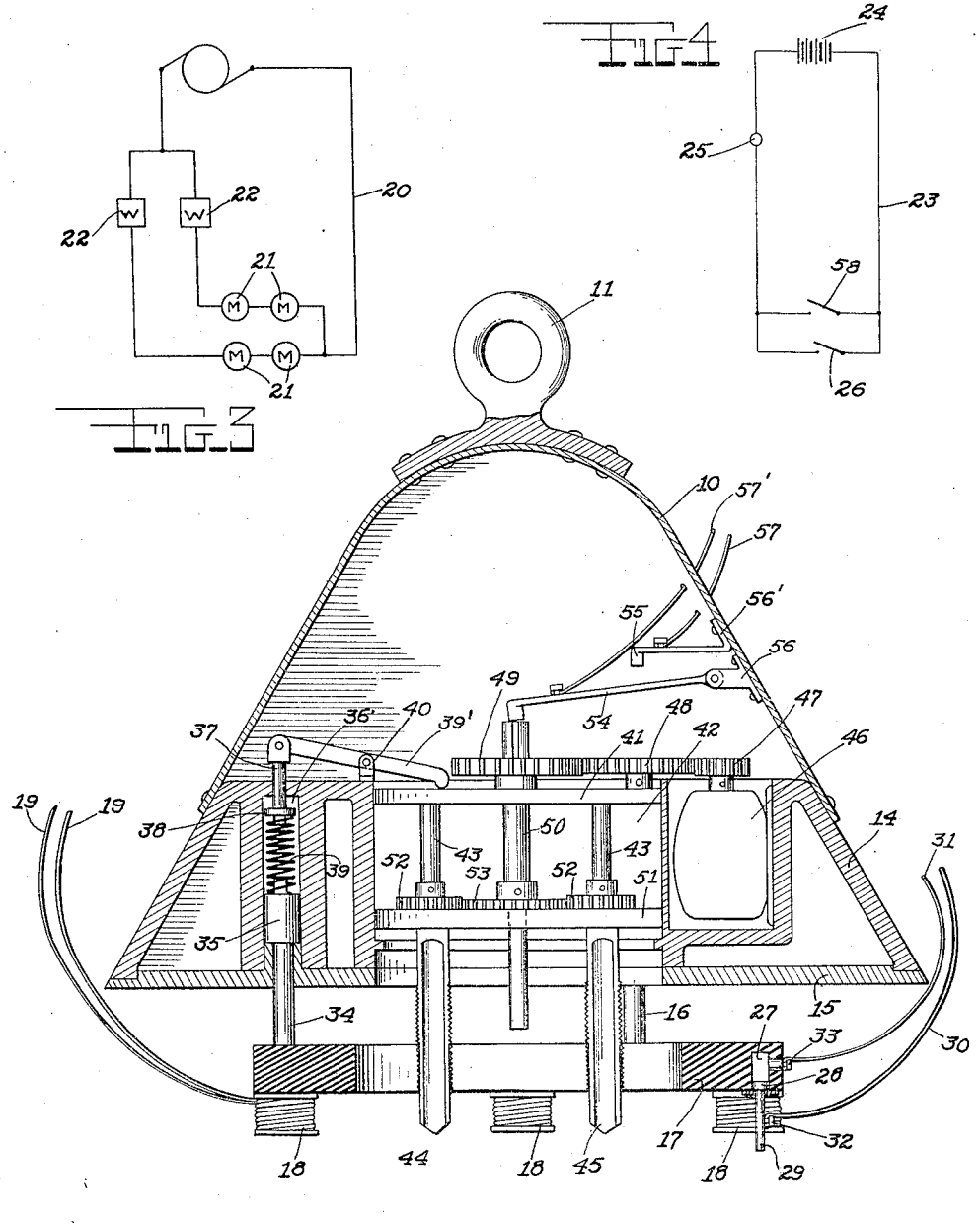

M. SLIWINSKI.
SHIP SALVAGE DEVICE.
APPLICATION FILED NOV. 8, 1919.

1,333,783.

Patented Mar. 16, 1920.
3 SHEETS—SHEET 3.

INVENTOR.
MICHAL SLIWINSKI
BY *George C. Heinrich*
ATTORNEY.

UNITED STATES PATENT OFFICE.

MICHAL SLIWINSKI, OF PLAINFIELD, NEW JERSEY.

SHIP-SALVAGE DEVICE.

1,333,783.  Specification of Letters Patent.  Patented Mar. 16, 1920.

Application filed November 8, 1919. Serial No. 336,603.

*To all whom it may concern:*

Be it known that I, MICHAL SLIWINSKI, a citizen of Poland, residing at Plainfield, county of Union, and State of New Jersey, have invented certain new and useful Improvements in Ship-Salvage Devices, of which the following is a specification.

This invention relates to improvements in ship salvage devices, particularly devices in which means are provided for indicating the location of sunken ships.

The principal object of the invention is to provide an instrument for locating a sunken vessel and for indicating this fact on the salvage vessel.

A further object of the invention is to provide a salvage device including a plurality of drills for connecting the ship salvage means with a sunken vessel.

These and other like objects are attained by the novel construction and combination of parts hereinafter described and shown in the accompanying drawings, forming a material part of this disclosure, and in which—

Figure 1 is a side elevational view of a sunken ship and its connection with a salvage vessel by the device according to the present invention.

Fig. 2 is a bottom plan view of the locator and drill casing closing plate.

Fig. 3 shows a diagram of the elevational connections for the locator magnet circuit.

Fig. 4 is a similar diagram of the electrical connections of the signal circuit.

Fig. 7 is a longitudinal section through the locator and whole casing showing the interior arrangement.

Figure 5:
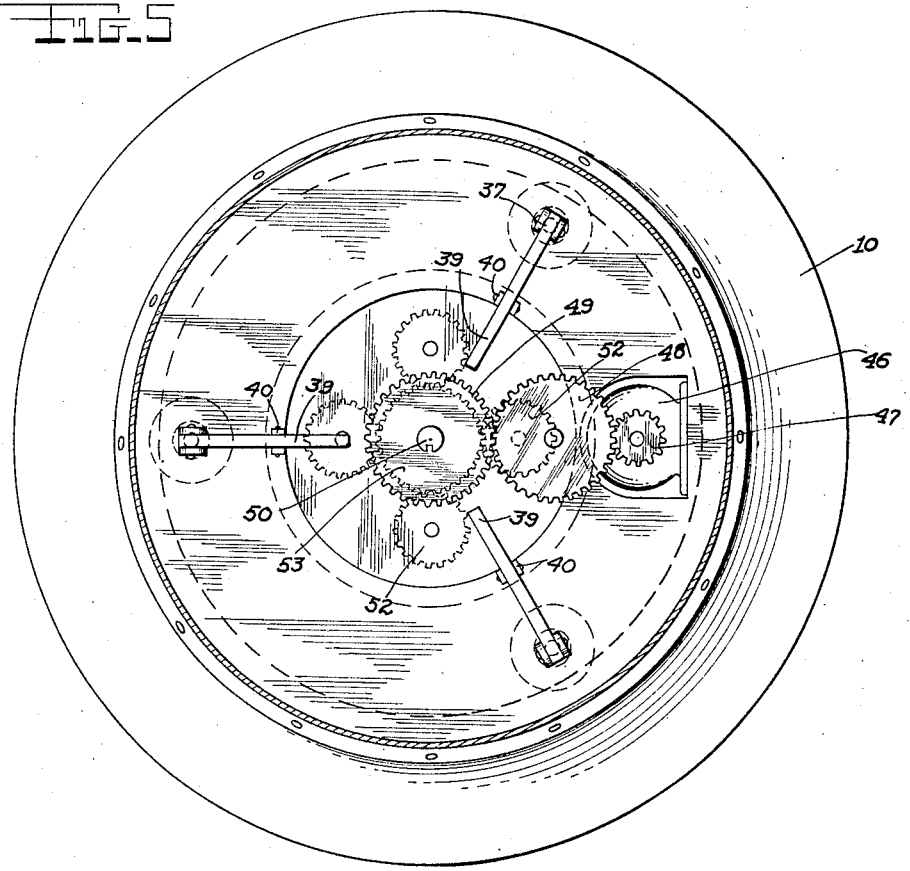
Fig. 5 is a bottom plan view of the locator and drill casing.

The casing 10 of the locator and drill has the shape of a bell provided at its upper part or apex with an eyelet 11 to which the salvage cable 12 is secured with one end, while its other end is secured to a suitable lifting device on board of the salvage vessel 13.

To the inner walls of the casing at the lower end thereof a chambered body 14 is secured.

From the base plate 15 of said body is suspended as indicated at 16 a disk 17 provided with a plurality of electromagnets 18 and 18. The single magnets are electrically connected and the outer electromagnet 18 is connected by wires 19 and 19' with a circuit 20 on board of the salvage vessel 13 in which a plurality of electromagnets 21 and 21 are located and two meters 22 for indicating the presence of a large steel body in the neighborhood of the electromagnet 18.

Figure 6:
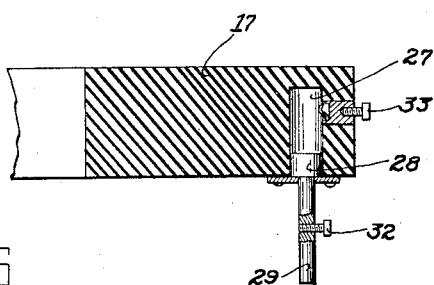
Fig. 6 is a detail view, partly in section of a switch.

A signal circuit 23 in which a battery 24 and a lamp 25 are located is connected to the first named circuit and a switch 26 is provided in this circuit for closing the signal circuit over the lamp as soon as the device strikes the bottom of the sea or any solid obstacle. For this purpose the disk 17 is provided with a cylindrical bore 27 in which a piston 28 and rod 29 is working; as soon as the lower end of the rod strikes against an obstruction it will close the signal circuit over the wires 30 and 31 secured to pole screws 32 and 33 respectively as clearly shown in Figs. 6 and 7.

To the opposite part of the disk 17 the rod 34, of a piston 35 is secured which is working in one of the chambers 36 in the body 14. Through the top wall of said chamber 36 a piston rod 37 is working carrying a piston 38 at its lower end, and a spring 39 between pistons 35 and 38 is secured with one end to a pin on piston 35 and with its other end to a pin on piston 38. The upper end of rod 37 has pivotally secured thereto one end of a lever 39' pivotally secured intermediate its ends to a projection 40 of the body 14. The free end of lever 39' engages a disk or plate 41 arranged in a central chamber 42 of the body 14.

To the underside of this disk 41 are secured the shafts 43 of rotary drills 44 and 45 passing with their lower ends through suitable openings in disk 17.

The drills 44 and 45 are operated from a motor 46 located in one of the compartments of the body 14, the shaft of which is provided at its outer end with a gear 47 operating by the intermediary of a gear 48 a gear 49 upon a vertically movable shaft 50 which extends through a movable plate 51 upon which gears 52 are resting which are secured to shafts 43 and 43 and mesh into a gear 53 upon shaft 50.

Contact arms 54 and 55 are secured to suitable brackets 56 and 56' on the inner wall of the bell 10 and connected by wires 57 and 57' to the lamp or signal circuit.

The device operates as follows:—

As soon as the device approaches a wreck signals 22 will be caused to operate and when the device is placed on the wreck signal 25 will operate. The casting 14 tends to drop down on plate 41—51 and 35, this however, is prevented by spring 39 which acts as a cushion. The operator will now by any convenient means, as for instance the closure of switch 58 start the motor 46 to rotate the drills 44 and 45 which will be drawn through the ship's plate so that body 14 will drop and force the shaft 50 upward which will swing arm 54 upwardly around this pivot on bracket 56 to make contact with arm 55 and close a signal circuit 57', 57 and disengage the gears 52.

As soon as the drilling has reached a certain depth, the plate 17 will be pressed inwardly and through the intermediary of piston rod 34 will depress lever 39' to depress plate 41 and the drills.

In practice it will be observed that various changes may be made in the details of construction without departing from the general spirit of my invention.

Having thus described my invention what I claim as new and desire to secure by Letters Patent, is—

1. In a device of the character described the combination of a lifter body adapted to be engaged by a salvage cable, a chambered element at the lower end of said body, a motor in one of the chambers in said body, a plurality of drills, a movable bottom plate, electro-magnets on said bottom plate, means for operating the drills from said motor, and signaling means on the device.

2. In a device of the character described comprising a bell, a chambered body, a motor in one of the chambers of said body, a movable plate adapted to engage the lower end of said body, a plurality of drills, a movable shaft and gears on said drills and shaft for operating said drills from said motor, an electric switch in said movable plate for closing a detector circuit, a plurality of plates through which said drills are passed and means for advancing said plates in harmony with the advancing drills.

3. In a device of the character described the combination of a hollow body, with a chambered element in the lower part of the body, an eye on said body for the attachment of a salvage cable, a motor in one of the chambers of said body, a bottom plate, electro-magnets in said latter plate, a piston switch in said plate, a signal circuit including a lamp adapted to be controlled by said switch, a plurality of drills movably secured in said element, a train of gears for transmitting the motion of the motor shaft to said drills, a means for advancing the drills during their operation, a means for automatically cutting out the train of gears upon the finishing of the drilling operation and a means for closing a circuit by said cutting out means substantially as described.

In testimony whereof I have affixed my signature.

MICHAL SLIWINSKI.